March 7, 1967      R. FAVRE      3,308,313

TORSION OSCILLATOR

Filed Jan. 11, 1966

United States Patent Office 3,308,313
Patented Mar. 7, 1967

3,308,313
TORSION OSCILLATOR
Robert Favre, Lausanne, Switzerland, assignor to Fabriques Movado, Fonds, Switzerland, and Manufacture des Montres Universal, Perret Freres S.A., Geneva, Switzerland
Filed Jan. 11, 1966, Ser. No. 519,845
4 Claims. (Cl. 310—36)

This application is in part a continuation of United States Ser. No. 290,562, filed June 25, 1963, now abandoned.

Various torsion oscillators are known which can be used as a time basis. Certain of them comprise two oscillating masses uniformly distributed about their axis of symmetry and fixed to each of the ends of a torsion spring system, the central portion of which is embedded in a support. The masses then oscillate in two parallel planes disposed above and below said support respectively; for the purpose of dynamically balancing the assembly, the principle of causing these two masses to oscillate while offsetting their phase by 180° has already been conceived.

It is moreover also known to dispose the two masses in the same plane and to fix each of them with the aid of a torsion spring, these two springs being embedded in the same plate.

Torsion oscillators of this type being, however, difficult to fit to time pieces of small volume, the present invention has precisely the object of providing an oscillator of this type which combines the advantages of small height, a high resonance factor, and an electro-dynamic sustaining device which is particularly well arranged and dimensioned.

The present invention provides a torsion oscillator for electronic clocks comprising two torsion spring systems which are arranged coaxially and whose torsional axes coincide in a common axis, a support extending at right angles to the common torsional axis, the two torsion spring systems being so fixed to the said support that one spring system extends to the other spring system, and two oscillating masses fixed to the free ends of the two spring systems, there being electronic means such as a battery-energized transistorized drive circuit for electrodynamically maintaining the oscillation of the two masses in counterphase, one part of the electronic means being arranged on the said masses while another part of the electronic means is stationary, characterized in that the said common support is fixed in its turn to a base of the clock by elastically deformable torsive securing means.

The invention also provides a torsion oscillator for electronic clocks comprising two masses which oscillate in counterphase and are fixed one to each end of a torsion spring system and are provided with means for electro-dynamically maintaining the oscillations, the torsion spring system being clamped between the two masses to a support oriented normally to the axis of oscillation, characterized in that the two masses, apart from portions thereof that extend radially to the torsional axis, have elements which are bent parallel to the torsional axis and extend each towards the other mass so as to overlap in the direction of the torsional axis.

Three embodiments of the invention are illustrated in the accompanying drawing wherein.

Figure 1:
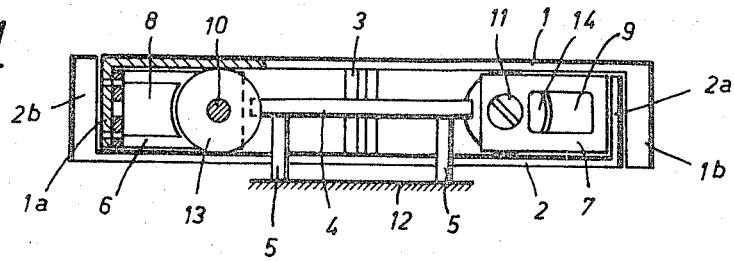
FIGURE 1 is a longitudinal section of the first embodiment.

In FIGURE 1, the oscillator has two superimposed oscillating arms 1 and 2, each of which is fixed to one of the ends of a spring system 3, which itself is clamped between the arms to a support 4. The support, which extends laterally beyond the arms, and is oriented normally to the axis of oscillation with the aid of four elastic rods 5 fixed to the plate 12 of the movement on each side of said arms.

Each arm 1, 2 respectively has at its ends elements 1a, 1b and 2a, 2b respectively which are bent over at right angles to its plane and therefore parallel to the torsional axis in the downward direction in the case of arm 1 and in the upward direction in the case of arm 2. The distance between these elements is made such that the arms can fit one in the other while able to oscillate in counterphase. This arrangement makes it possible to obtain a particularly low and compact construction.

The elements 1a, 2a respectively each carry a frame 6, 7 on which there are fixed on the one side a permanent magnet 8, 9 respectively and on the other side a soft iron core 10, 11. While the magnetic axes of the magnets are disposed parallel to the axis of the arms, the axes of the cores are disposed perpendicularly thereto. Each of these cores penetrates into a stationary coil 13, 14, respectively, fixed to the support 4 while one of the operative poles of the corresponding magnet 8, 9, respectively, is directed facing the outer surface of said coil, from which it is separated only by a small space. The two other elements 1b, 2b respectively serve as counterweights.

One magnet coil-pair is in the central circuit of a transistor while the other magnet coil-pair is in the output circuit of a known transistor (not shown).

The change in flux in the core 11 induces a current pulse in control coil 14 which is in the base-emitter circuit of a conventional electronic sustaining device such as a transistor; and this current pulse switches on or brings the transistor into the conducting state. A collector current now flows through the transistor and energizes the working coil 13 in the output circuit of the transistor. The working coil then acts on the magnet 8 at one end of the other arm giving it driving impulses whereby the arm receives impulses periodically.

With regard to the meaning and function of the elastic rod 5 by which the common support 4 is secured to the base plate 12, the following is to be observed. It is known mechanically to intercouple two oscillatory systems having *two* oscillating masses for obtaining a defined total frequency. For instance in the case of a tuning fork the two prongs of the fork are obviously coupled mechanically by the so-called foot of the tuning fork. In this case the fork foot is decisive for the function of the tuning fork. It is also known in "coupled pendulums" to effect the coupling either by a spring interconnecting the two pendulums or by suspending both pendulums jointly upon one column which is capable of oscillation. Thus in the present invention the common support 4 of the two torsion spring system has in the first place a function analogous to that of the tuning fork foot in a tuning fork or in the case of coupled pendulums their common connecting spring (or else their common elastic suspension column capable of oscillation).

As the theory of mechanical coupling of two oscillating masses is known, use is made in it of the inner elastic deformability of the common supporting mass which receives thes re-action momentum of each individual oscillating mass and at the same time transmits it to the other oscillating mass. It is well known that in the ideal case of two separately driven masses which have completely identical mechanical and physical properties a mechanical coupling would be superfluous, as then the two separate oscillating masses would oscillate absolutely synchronously by themselves. Such two masses, however, can never be obtained in practice, and so in practice they will have different proper frequencies which also depend in particular on the manner of their attachment to the support.

By securing the two oscillating masses to a common support the mass of this support is utilized as a "coupling medium" for obtaining synchronous resonant oscillation. In this way a large part of the energy that would otherwise be inevitably lost is saved, for the support oscillation generated in the support by the reaction momentum must not be simply absorbed by this, but on the contrary, as already mentioned, largely passed on to the other support.

Thus it has proved that the oscillatory system with the two torsion spring systems shown in the figures and described will function and have a certain mechanical coupling even if the common supports 4 themselves are rigidly anchored to the clock or if a part of the base plate itself is employed as the support 4. Such a construction, however, which seems natural at first sight, has the disadvantage that the size of the coupling between thes two spring systems is comparatively small and is very sensitive to the properties of this base plate, on how it is secured to the clock casing and what other parts it carries. Most of the energy of oscillation received by the base plate is then absorbed in an undefined way by the mass of this base plate. A certain degree of coupling will, of course, be always "automatically" there, as clearly the periodical reaction momentum of the one spring system will be transmitted—as it were in the form of microscopic oscillations—through the mass of the plate to the other spring system.

Now it has surprisingly turned out that the coupling of the two oscillating masses is substantially strengthened if the common support 4 is itself secured to the base plate by means of elastically yielding and torsional elements 5. In this way the plate 4 is allowed to yield freely to the enforced oscillations—extraordinarily small in practice—to which it is subject and largely to transmit these oscillations to the corresponding second torsion spring system, without these oscillations being absorbed in the plate as an energy leakage. It has further been shown that the common oscillation frequency of the system as a whole, when such an elastic connection 5 of the common support 4 with the base plate 12 has been provided, is practically wholly independent from the properties of the base plate and how it is itself secured to the clock casing. Thus owing to this elastic mounting of the support 4, on the one hand, the "resonance effect" or else, what amounts to the same, the mechanical coupling of the two spring systems is actually enhanced and so energy leakage reduced, and, on the other, greater stability of frequency is ensured in as much as the frequency is now independent of the mode of attachment of the base plate. This requires no special construction of the elastic elements 5; it is sufficient if they are themselves elastically yielding and, also torsionable. This automatically confers the indicated desirable properties on the oscillator systems as a whole.

The node of oscillation of the torsion spring system 3 shown in FIGURE 1 is located at the tension point of this spring system in the support 4. In the case of two mechanically separate spring systems which are anchored in the plate 4 only with their ends pointing towards each other there will, of course, be strictly speaking two nodes of oscillation, one at the tensioning point of each spring in the plate 4. When, however, the torsion spring system 3 consists of continuous springs, the one half-spring whereof extending to the one side of the support 4 forms the one oscillatory system and the half-spring extending to the other side of the support 4 forms the other system, there will be only one node of oscillation located at the centre of thickness of the plate 4.

Figure 3:
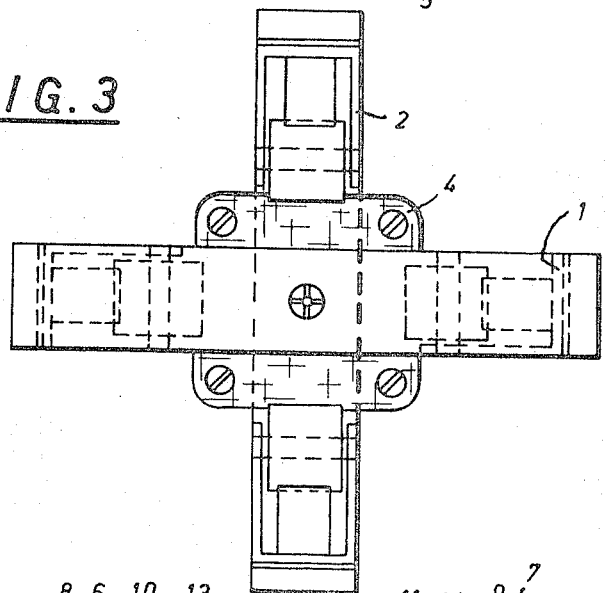
FIGURE 3 is a plan view of the second embodiment wherein the two oscillating masses are associated in a cruciform arranged in two superimposed planes.
Figure 4:
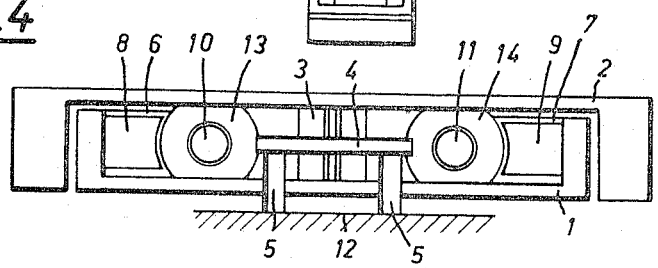
FIGURE 4 is a section of another embodiment.

FIGURE 3 shows the second embodiment, where the arms 1 and 2 are disposed at right angles to one another. Each arm now comprises two electrodynamic heads of the type described in the previous embodiment, two of these being driving heads and the other two collecting heads.

Finally, in the third embodiment, the arm 1 alone carries the two electrodynamic sustaining devices and is enclosed within the interior of the arm 2, which plays only a reactive part in order to ensure the dynamic balancing of the whole arrangement.

As shown, arm 1 has its two ends bent at right angles upwardly and lies within the complementarily but downwardly bent arms of arm 2. Mounted by any suitable means on arm 1 are frames 6 and 7 on which are secured permanent magnets 8 and 9, respectively, and soft iron cores 10, 11 and the axes of these cores are disposed perpendicular to the axis of the arms while the magnetic axes of the magnets are disposed parallel to the axis of the arms. Each of the cores penetrates into a stationary coil 13, 14, respectively secured to support 4. In this embodiment only one of the two arms carries a part of the means for electronically maintaining oscillations while the other only serves for generating a mechanical counter-torque during the oscillation of the oscillator.

It should be noted that each coil can have two windings, one a collecting winding and the other a driving winding. Similarly, it would be possible to use only a single coil and a single magnet. Finally, the phase displacement of the movements of the arms could be so selected as to influence the coefficient of resonance of the whole arrangement.

The fixing of the arms on an elastic support according to the invention makes it possible to strengthen the coupling of these arms and thus to improve the resonance effect of the oscillator. This gives rise to the possibility of maintaining satisfactory oscillation with less energy. In addition, the mounting of the fixed coils, not on the plate, but on the elastic support, makes it possible to avoid irregularities due to the effects of the oscillation of the support on the oscillation of the arms. Finally, the length of the spring can be reduced, thus making it possible to reduce the height of the oscillator. This dimension is also reduced in plan because of the possibility the two oscillating arms can fit one onto the other.

Figure 2:
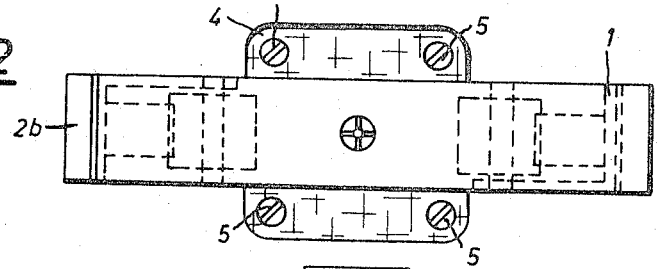
FIGURE 2 is a plan view of FIGURE 1.

In all embodiments of the invention, the arms oscillate in counterphase to each other. Thus, when seen from above as in FIGURES 2 and 3, if one arm oscillates clockwise about the torsional axis of the spring system standing at right angles to the plane of the drawing, the other arm will simultaneously swing counterclockwise and vice versa.

Accordingly, the torsion spring system may either comprise two mechanically separate spring systems which are fixed on two sides to the support 4, or else the continuous springs of the system may be clamped down in their middle part by support 4 in such a way that there is a separately oscillating structure on each side of the support.

What I claim is:

1. A torsion oscillator for an electronic clock having a base comprising two torsion spring systems arranged coaxially having torsional axes coinciding in a common axis, a support having two sides and extending at right angles to the common torsional axis, said spring system being fixed to said support, one of said systems extending out from one side of the support and the other system extending out from the other side of the support, two oscillating masses fixed to the free end of the two spring systems adapted to have their oscillations maintained in counterphase by electro-dynamic means, and deformable torsive securing means fixing said support to a base of the clock, said oscillating masses having elements bent parallel to the torsional axis and extending each towards the other so as to overlap in the direction of the torsional axis.

2. A torsion oscillator for an electronic clock having a base comprising two torsion spring systems arranged coaxially having torsional axes coinciding in a common axis, a support having two sides and extending at right angles to the common torsional axis, said spring system being fixed to said support, one of said systems extending out from one side of the support and the other system extending out from the other side of the support, two oscillating masses fixed to the free end of the two spring systems adapted to have their oscillations maintained in counterphase by electrodynamic means, and deformable torsive securing means fixing said support to a base of the clock, said two masses comprising two arms which are disposed parallel to each other and whose outside ends are bent normally toward each other.

3. A torsion oscillator for an electronic clock having a base comprising two torsion spring systems arranged coaxially having torsional axes coinciding in a common axis, a support having two sides and extending at right angles to the common torsional axis, said spring system being fixed to said support, one of said systems extending out from one side of the support and the other system extending out from the other side of the support, two oscillating masses fixed to the free end of the two spring systems adapted to have their oscillations maintained in counterphase by electro-dynamic means, and deformable torsive securing means fixing said support to a base of the clock, said two masses comprising two arms which are disposed parallel to each other and whose outside ends are bent normally toward each other, one of said arms serving only for generating a mechanical counter torque during the oscillation of the oscillator.

4. A torsion oscillator for an electronic clock having a base comprising two torsion spring systems arranged coaxially having torsional axes coinciding in a common axis, a support having two sides and extending at right angles to the common torsional axis, said spring system being fixed to said support, one of said systems extending out from one side of the support and the other system extending out from the other side of the support, two oscillating masses fixed to the free end of the two spring systems adapted to have their oscillations maintained in counterphase by electro-dynamic means, and deformable torsive securing means fixing said support to a base of the clock, wherein said support is a plate and said elastic torsive means consist of a rod supporting the plate and fixed to said base of the clock.

References Cited by the Examiner

UNITED STATES PATENTS

| | | | |
|---|---|---|---|
| 2,852,725 | 9/1958 | Clifford | 310—25 X |
| 2,939,971 | 9/1960 | Holt | 310—15 |
| 3,076,108 | 1/1963 | Oliver et al. | 310—29 |
| 3,113,463 | 12/1963 | Holt | 310—25 X |

MILTON O. HIRSHFIELD, *Primary Examiner.*

D. F. DUGGAN, *Assistant Examiner.*